US012630326B1

(12) United States Patent
Dietz et al.

(10) Patent No.: US 12,630,326 B1
(45) Date of Patent: May 19, 2026

(54) AUTOMATED INTELLIGENT SYSTEMS TO OPEN CARDBOARD CONTAINERS

(71) Applicant: Amazon Technologies, Inc., Seattle, WA (US)

(72) Inventors: Timothy G. Dietz, Reading, MA (US); Pablo Hernández-Becerro, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 18/535,210

(22) Filed: Dec. 11, 2023

(51) Int. Cl.
*B65B 69/00* (2006.01)
*G05B 13/02* (2006.01)

(52) U.S. Cl.
CPC ...... *B65B 69/0033* (2013.01); *G05B 13/0265* (2013.01)

(58) Field of Classification Search
CPC ..................... B65B 69/0033; G05B 13/0265
See application file for complete search history.

(56) References Cited

U.S. PATENT DOCUMENTS

| | | | | |
|---|---|---|---|---|
| 4,859,132 A | * | 8/1989 | Chasseray | B30B 9/321 |
| | | | | 414/412 |
| 5,423,649 A | * | 6/1995 | Maeda | B65B 69/0008 |
| | | | | 83/402 |
| 6,694,852 B1 | * | 2/2004 | Ours | B65B 69/0033 |
| | | | | 414/412 |

| | | | | |
|---|---|---|---|---|
| 7,720,567 B2 | * | 5/2010 | Doke | B25J 11/0055 |
| | | | | 700/230 |
| 9,457,474 B1 | * | 10/2016 | Lisso | B26D 1/45 |
| 9,926,094 B2 | * | 3/2018 | Dugat | B65B 57/02 |
| 10,664,767 B2 | * | 5/2020 | Takigawa | B23K 26/707 |
| 10,955,826 B2 | * | 3/2021 | Edwards | B65B 69/00 |
| 11,331,758 B2 | * | 5/2022 | Hawkins | B65B 35/24 |
| 2001/0003939 A1 | * | 6/2001 | Liu | B26D 1/18 |
| | | | | 83/72 |
| 2002/0162302 A1 | * | 11/2002 | Thomson | B65B 69/0033 |
| | | | | 53/381.2 |
| 2004/0051720 A1 | * | 3/2004 | Hall | G05B 19/40935 |
| | | | | 345/689 |
| 2004/0194428 A1 | * | 10/2004 | Close | B65B 69/0025 |
| | | | | 53/381.2 |

(Continued)

*Primary Examiner* — Veronica Martin
*Assistant Examiner* — Mobeen Ahmed
(74) *Attorney, Agent, or Firm* — Eversheds Sutherland (US) LLP

(57) ABSTRACT

Systems and methods are disclosed for automated intelligent opening of cardboard containers and related container types devices. In one embodiment, an example system may include a container opening device, and a controller configured to determine a first image of a first package, determine, using the first image, a first cut path for the container opening device, and determine, using the first image, a first type of packaging material of the first package. The controller may determine, using the first type of packaging material and a first machine learning model, a first amount of axial force to apply to the external surface of the first package via the container opening device, and cause the container opening device to (i) apply the first amount of axial force to the external surface of the first package, and (ii) move along the first cut path to open the first package.

17 Claims, 10 Drawing Sheets

(56)  References Cited

U.S. PATENT DOCUMENTS

| | | | | |
|---|---|---|---|---|
| 2007/0125209 A1* | 6/2007 | Hilgendorf | .......... | B26D 7/2621 |
| | | | | 83/72 |
| 2007/0162174 A1* | 7/2007 | Doke | ..................... | B25J 9/0093 |
| | | | | 700/114 |
| 2010/0043610 A1* | 2/2010 | Tanaka | .................... | B26D 7/12 |
| | | | | 83/174.1 |
| 2016/0016684 A1* | 1/2016 | Dugat | ................... | B23K 26/38 |
| | | | | 53/75 |
| 2016/0026168 A1* | 1/2016 | Crystal | ................... | B26D 5/34 |
| | | | | 700/114 |
| 2016/0031580 A1* | 2/2016 | Dugat | .................... | B65B 57/02 |
| | | | | 83/13 |
| 2018/0281219 A1* | 10/2018 | Larsson-Hall | .......... | B26D 5/12 |
| 2018/0326590 A1* | 11/2018 | Masuda | ................... | B25J 15/04 |
| 2019/0152634 A1* | 5/2019 | Almogy | ............... | B65G 1/1376 |
| 2019/0276176 A1* | 9/2019 | Almogy | ................ | B65G 65/00 |
| 2020/0047364 A1* | 2/2020 | Hawkins | ............. | B26D 7/0625 |
| 2020/0047365 A1* | 2/2020 | Hawkins | ................ | B65G 13/04 |
| 2020/0273131 A1* | 8/2020 | Martin, Jr. | ......... | G06Q 10/0875 |
| 2020/0306973 A1* | 10/2020 | Edwards | ................ | B25J 9/1694 |
| 2020/0339298 A1* | 10/2020 | Edwards | ............ | B23K 26/0626 |
| 2020/0341453 A1* | 10/2020 | Edwards | ................ | G06V 10/75 |
| 2022/0063042 A1* | 3/2022 | Edwards | ............. | B25J 11/0055 |
| 2022/0219846 A1* | 7/2022 | Jackson | ................ | H04N 23/90 |
| 2022/0219857 A1* | 7/2022 | Tsujimori | ............. | B25J 15/009 |
| 2023/0140119 A1* | 5/2023 | Jackson | ................ | G06V 20/52 |
| | | | | 382/177 |
| 2023/0219708 A1* | 7/2023 | Mell | ................... | B65B 69/0033 |
| | | | | 414/810 |
| 2023/0356423 A1* | 11/2023 | Capelli | .................... | B26D 5/04 |
| 2024/0308714 A1* | 9/2024 | Steele, Jr. | ............. | B65B 69/005 |
| 2024/0424683 A1* | 12/2024 | Miyauchi | ............ | B65B 69/0033 |
| 2025/0050438 A1* | 2/2025 | Edwards | ................ | G06F 18/25 |
| 2025/0063097 A1* | 2/2025 | Li | ........................... | H04L 67/51 |
| 2025/0073904 A1* | 3/2025 | Miyauchi | ............... | B25J 9/1697 |
| 2025/0091751 A1* | 3/2025 | Prasad | ................... | B65B 57/18 |
| 2025/0108950 A1* | 4/2025 | Holmes | .................. | G01V 8/12 |
| 2025/0302556 A1* | 10/2025 | Forstein | ................ | A61B 34/25 |

* cited by examiner

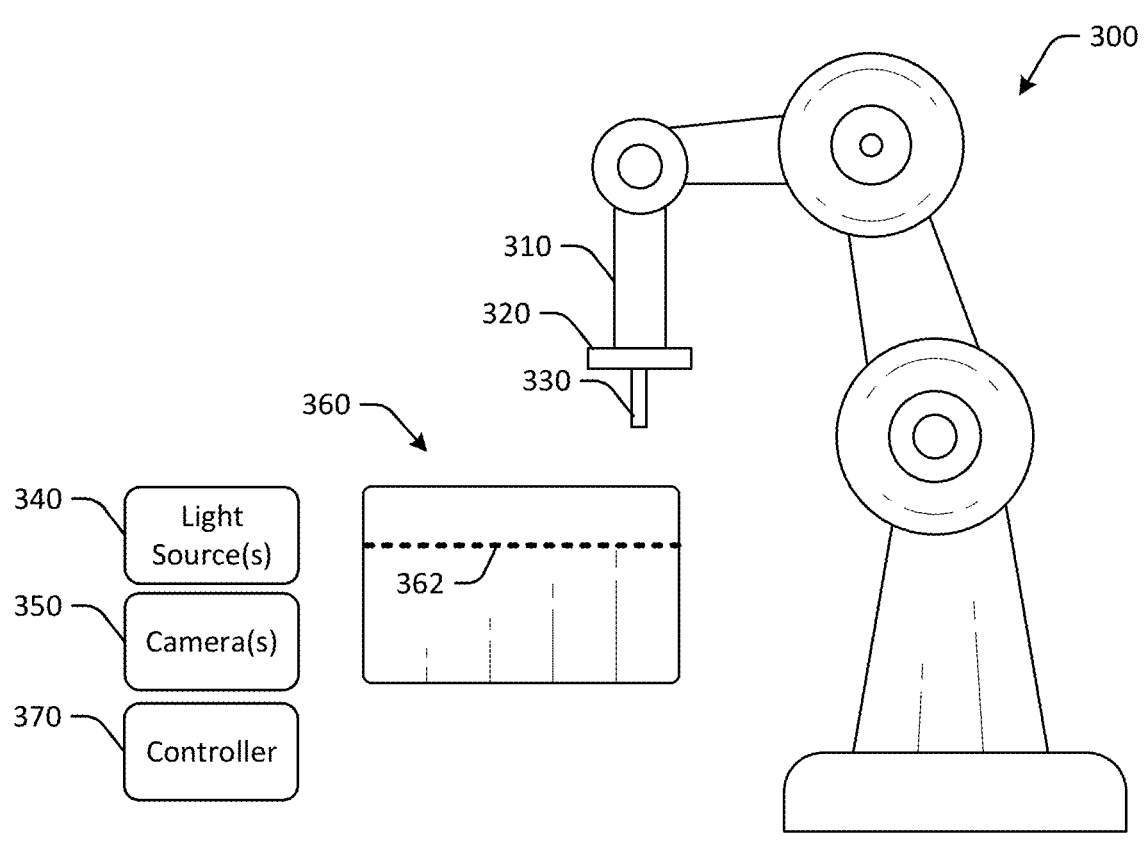
300
310
320
330
360
362
340 Light Source(s)
350 Camera(s)
370 Controller
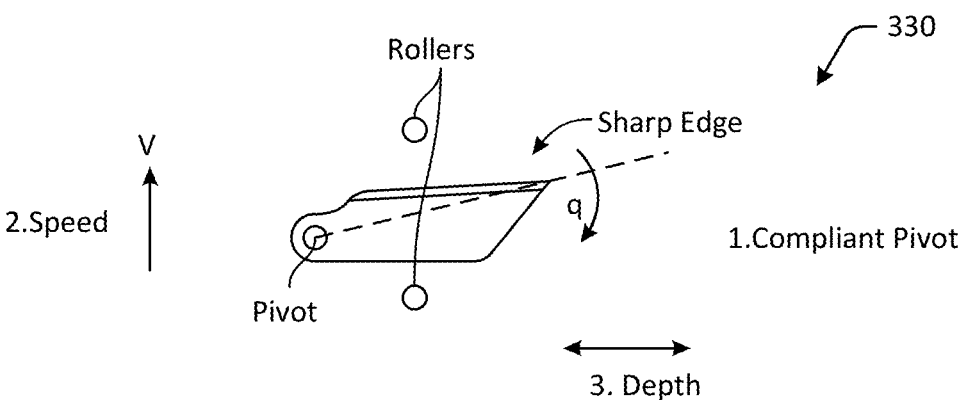
330
Rollers
Sharp Edge
V
2.Speed
q
Pivot
1.Compliant Pivot
3. Depth
4. Constant Depth With Changing q
FIG. 3

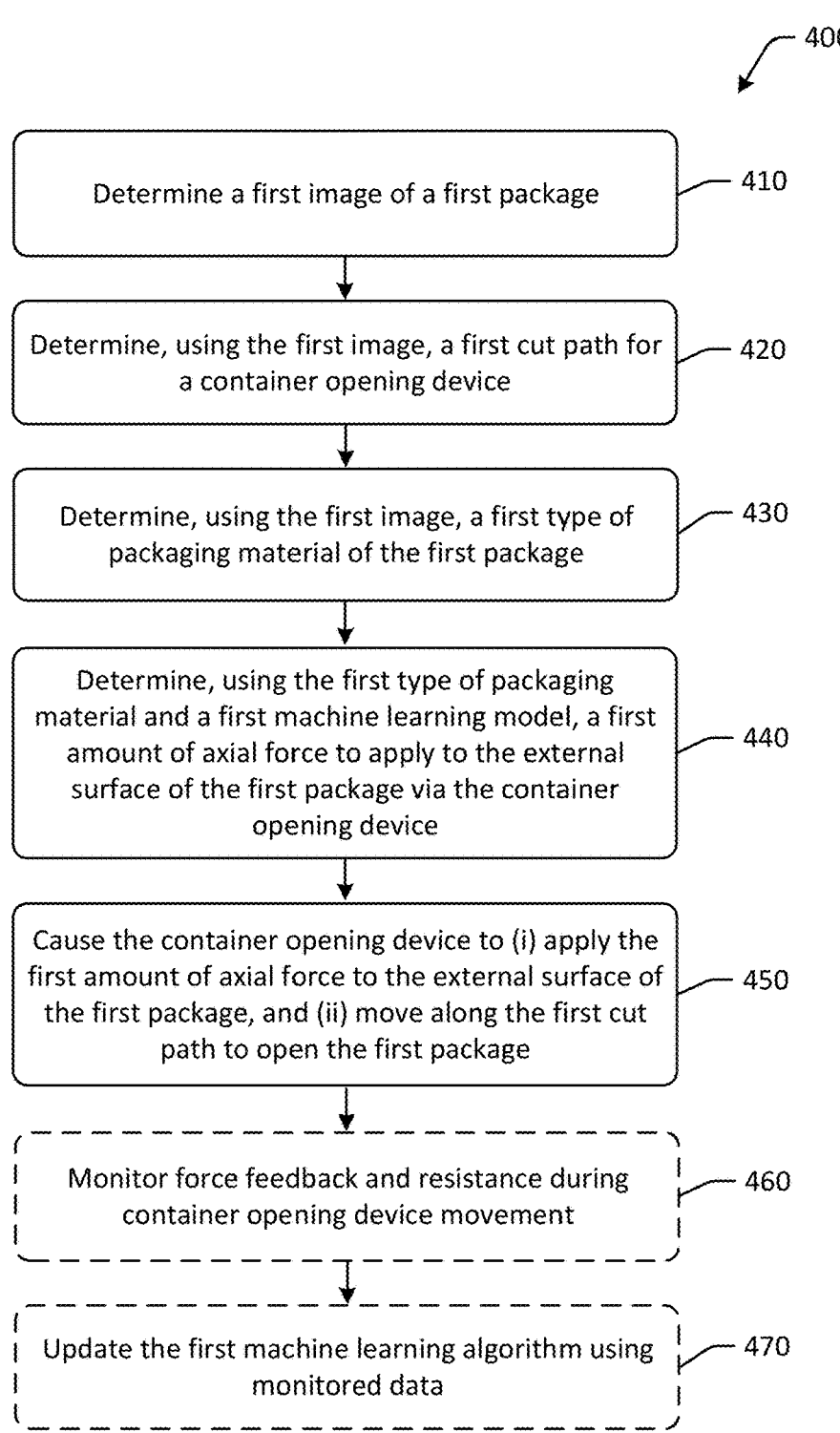

400

Determine a first image of a first package — 410

Determine, using the first image, a first cut path for a container opening device — 420

Determine, using the first image, a first type of packaging material of the first package — 430

Determine, using the first type of packaging material and a first machine learning model, a first amount of axial force to apply to the external surface of the first package via the container opening device — 440

Cause the container opening device to (i) apply the first amount of axial force to the external surface of the first package, and (ii) move along the first cut path to open the first package — 450

Monitor force feedback and resistance during container opening device movement — 460

Update the first machine learning algorithm using monitored data — 470

FIG. 4

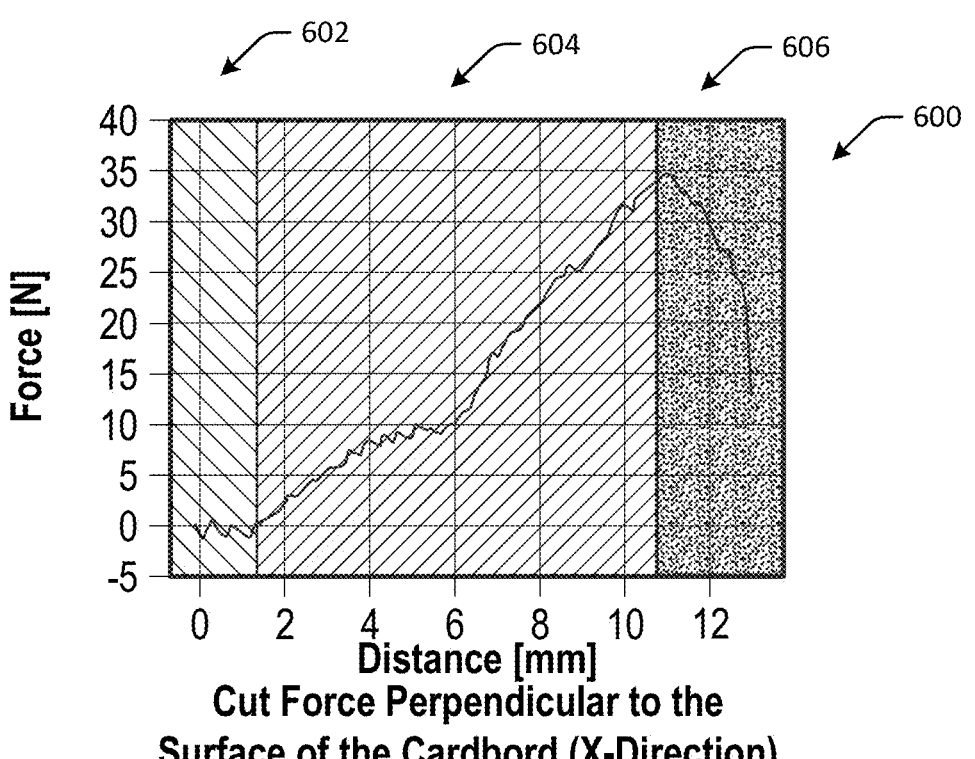
**Cut Force Perpendicular to the
Surface of the Cardbord (X-Direction)**
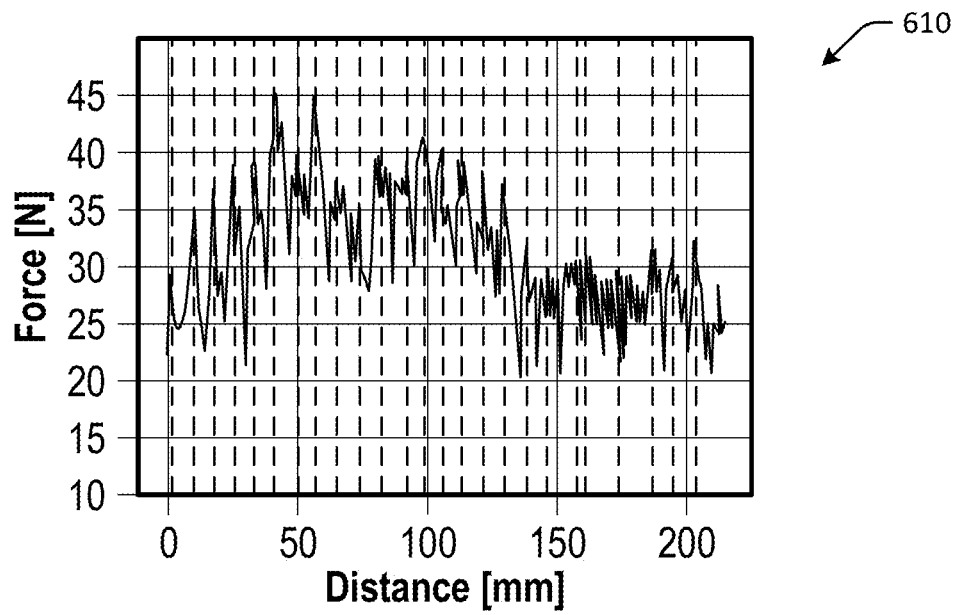
Force Measurement in Feed Direction Over Distance
FIG. 6

AUTOMATED INTELLIGENT SYSTEMS TO OPEN CARDBOARD CONTAINERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements in picking technology, sorting technology, packing technology, and so forth may be desired, such that manual efforts can be redirected to different tasks.

BRIEF DESCRIPTION OF THE DRAWINGS

FIG. 3 is a schematic illustration of a container opening system in accordance with one or more embodiments of the disclosure.

FIG. 4 is an example process flow for automated intelligent opening of containers in accordance with one or more embodiments of the disclosure.

FIG. 6 depicts example force measurements in accordance with one or more embodiments of the disclosure.

Figure 1A:
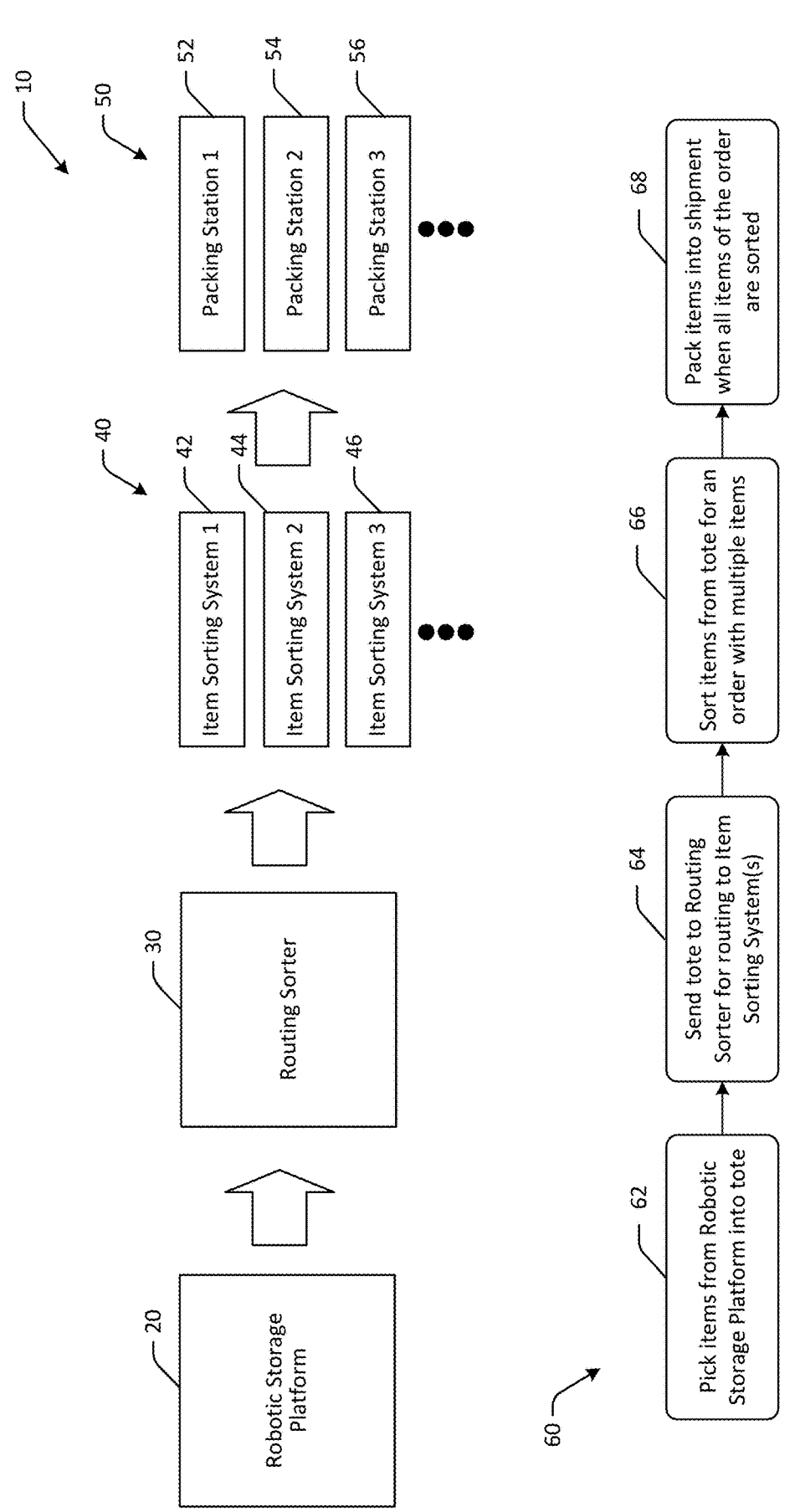
FIGS. 1A-1C are hybrid schematic illustrations of an example use case for automated intelligent systems to open cardboard containers and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with case. However, robotic handling of items may require various levels of dexterity. Similarly, when retrieving items from cluttered areas, such as a single item from a bin full of items, robotic manipulators may be limited by an exposed area of the item to be grasped, and so forth. Moreover, during ingesting of items into fulfillment centers or other facilities, such items may arrive in packages, such as cardboard or corrugate packages or other types of containers. In order to remove the items from the package and transport downstream to store in inventory, the packages may need to be opened. However, opening high volume packages may be time consuming and cumbersome. In addition, the types of packages that are to be opened may vary, as some may be cardboard or other materials, some may be different shapes, sizes, and weights, some may have been damaged during shipping, some may have tape, staples, or other obstacles, and so forth. Accordingly, although packages may be easily opened manually, automated systems to open packages or other containers may be desired.

Embodiments of the disclosure include methods and systems for automated intelligent systems to open cardboard containers and other types of containers or packages. The systems may be configured to handle many different types of containers, and may intelligently open packages regardless of tape, staples, or other obstacles, as well as regardless of non-rectangular or damaged form factors. Some embodiments may implement one or more machine learning algorithms to increase the amount and types of packages that can be automatically opened over time, as well as to minimize a likelihood of damage to items inside the package. Some embodiments may use force feedback data, corrugate or cardboard type data, package weight data, and/or other data determined during opening of packages to update or retrain machine learning models. Some embodiments include optimized process flows for processing of orders at fulfillment centers, as well as process flows or methods to increase speed of transporting items as a result of improved package opening. As a result, throughput of fulfillment centers may be improved, and/or logistics of fulfillment center operations may be less complicated.

Figure 1B:
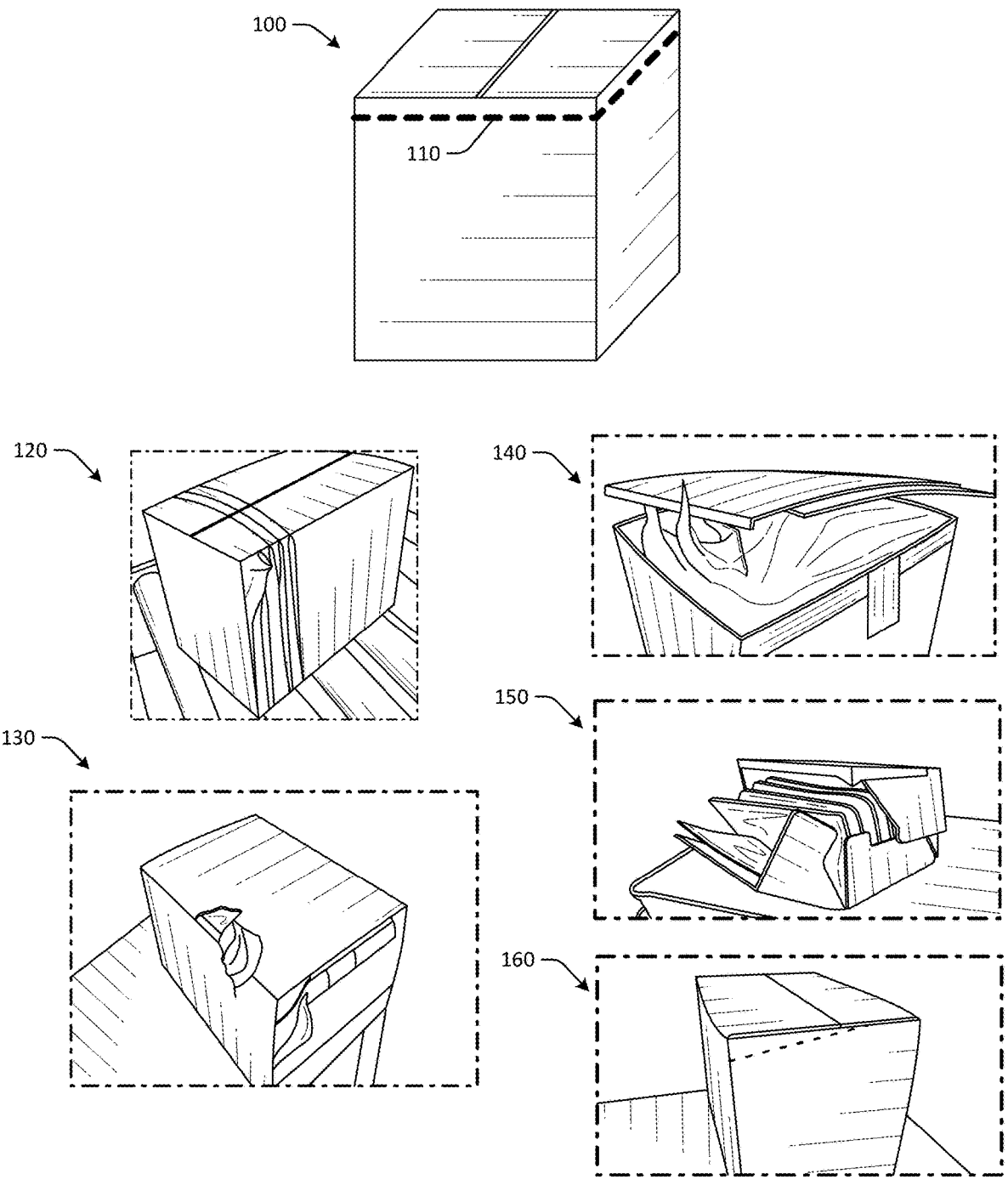
Figure 1C:
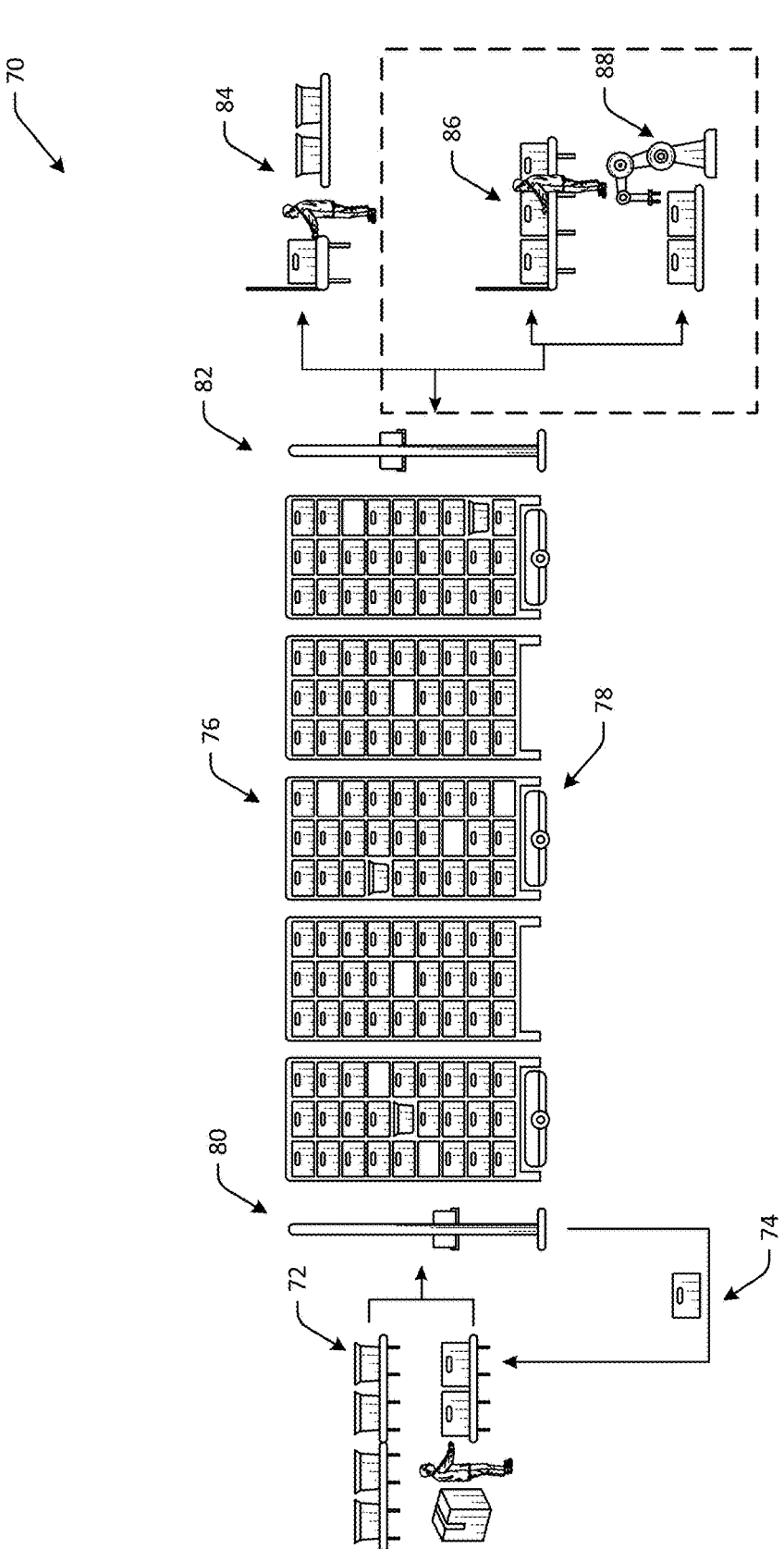

Referring to FIGS. 1A-1C, an example use case 10 for automated intelligent systems to open containers and an example process flow in accordance with one or more embodiments of the disclosure. Although discussed in the context of online orders, other embodiments may be directed to any suitable use case where products or containers are picked and/or sorted, or packages are sorted, such as instances where users may pick up orders rather than receiving a shipment, instances where items are aggregated for transport to another fulfillment center, and so forth.

In FIG. 1A, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used with end of arm tools described herein to pick products from inventory and/or to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1A, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1A, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1A may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

In FIG. 1B, items that are stored in inventory (prior to picking for shipment) may arrive to the facility in one or more packages. However, packages may have many different types of packaging materials (e.g., cardboard or corrugate, plastic, paper, etc.), as well as many different types of seals (e.g., tape on top, tape on sides, staples, straps, etc.) that form obstacles to open the package. Moreover, packages may be damaged during shipment, and may therefore not be easily opened while avoiding damage to contents inside the package. For example, a first package 100 may arrive to a facility intact and in good condition. Embodiments of the disclosure may automatically determine a first cut path 110 about which to cut the packaging material of the first package 100, so as to open the first package 100. The system may determine the first cut path 110 using one or more machine learning models, where inputs such as package size, packaging material type, package contents, presence of obstacles (e.g., staples, straps, heavy taping, etc.) and/or other inputs may be used to automatically determine the first cut path 110. The system may open the first package 100 using a container opening device, such as a box cutter, knife, or other device, that may be guided along the first cut path 110 via a robotic manipulator, such as a six-axis robotic arm, a three-axis robotic arm, a gantry, or other type of robotic manipulator.

| Other packages may arrive to be opened in different states and/or conditions. For example, a second package 120 may have a wrinkled exterior surface that may make it difficult to determine how much force is to be applied axially and/or laterally by the container opening device. A third package 130 may arrive with a hole or rip in an upper surface that needs to be avoided when determining a cut path. A fourth package 140 may arrive with an opened upper surface or partially ripped upper surface that compromises the integrity of the remainder of the package. A fifth package 150 may arrive popped open with contents exposed. A sixth package 160 may arrive with a compressed top that causes the package sidewalls to bow out.

Embodiments of the disclosure may be configured to open not only packages such as those depicted in the example of FIG. 1B, but additional package types as well, with the ability to increase the number and types of packages and conditions that can be opened over time due to machine learning. Accordingly, embodiments may be configured to open a variety of sizes, shapes and corrugate types of packages. Some embodiments may be configured to account for various package-specific factors, such as variations in the amount of tape used for closure, variations in the overall size as well as the aspect ratios of length, width, and height, variations in non-rectangular shape due to how the case was packed or what deformation the case experienced during shipment, variations in corrugate thickness, variations in the location of product within the volume of the container (e.g., tight vs loose packing, the presence of dunnage, the amount of air space at the top of the container, etc.), and so forth. Some embodiments may be implemented in an item decant process, where the items in a package are exposed via removal or partial removal of a top of a container, and where the remainder of the container is used to transport the items downstream, instead of the items being removed from the corrugate container, placed into a plastic or other type of container, and transported using the plastic or other type of container. Such processes may increase efficiency and reduce waste.

In FIG. 1C, an example automated storage and retrieval environment 70 is depicted. The automated storage and retrieval environment 70 may be a containerized fulfillment center solution that stores inventory in totes and implements automated workflows. Items emptied from opened packages may be routed downstream for storage. The automated storage and retrieval environment 70 may include a consolidation workflow, which involves combining inventory from emptier containers into fuller containers in order to ensure an automated induct process is not blocked due to insufficient empty/free spaces on container storage racks 76 for inserting new containers. Containerized inventory can flow through the automated storage and retrieval environment 70 via induct at containers 72 (which can include a decant process to move items to empty high capacity containers 74. A first gantry 80 may be used to load and/or unload containers from the container storage racks 76. The container storage racks 76 may be transported using autonomous robots 78. A second gantry 82 may be used to load and/or unload containers from the container storage racks 76. Containers may be moved downstream for manual or automated picking at a pick station 84, to a consolidation station 86 to consolidate items into fewer containers, and/or to robotic work cells 88 for automated picking and/or placement of items into or from containers.

Embodiments of the disclosure include automated intelligent systems to open cardboard containers that are configured to open various types of containers automatically. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
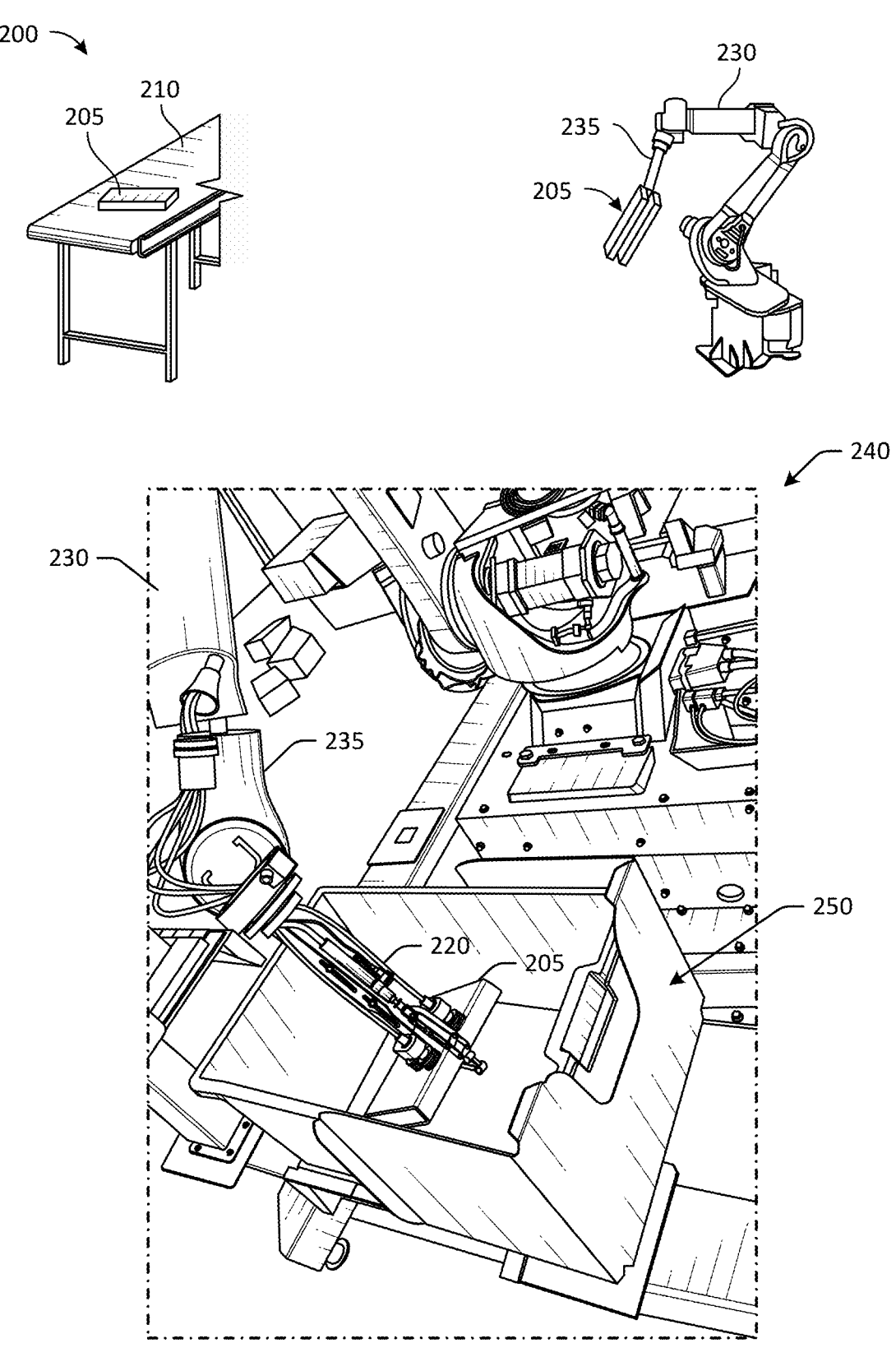
FIG. 2 is a schematic illustration of an example item handling system for moving items in accordance with one or more embodiments of the disclosure.

FIG. 2 is a schematic illustration of an example item handling system for moving items in accordance with one or more embodiments of the disclosure. Other embodiments may include additional or fewer components. The illustration of FIG. 2 may not be to scale, and may not be illustrated to scale with respect to other figures. The robotic manipulator and end of arm tool configured to grasp items illustrated in FIG. 2 may be used throughout the fulfillment center environment discussed with respect to FIGS. 1A-1B.

Inventory systems are utilized by many entities for storing and managing inventory. For example, some retailers may utilize a warehouse of racks that store items in various containers (also referred to as bins, storage locations, etc.). Items may be stowed in the various containers to hold the item in preparation for picking. For example, when an order for a specific item needs to be fulfilled by a retailer, the item can be picked (or retrieved) from the container where the item is stored. Inventory systems may use a mechanical system to stow an item into a container and/or pick an item from the container. The mechanical system may include a robotic arm that permits various sensors and end of arm tools (also referred to herein as end effectors and/or item manipulation devices) to interact with items outside and/or within multiple containers.

In some instances, the robotic arm uses an end of arm tool that can manipulate existing items within a densely packed container in order to create space to retrieve a particular item. As described herein, after grasping an item with the end of arm tool, the robotic arm can move or transport the grasped item from a first location to a second location.

In FIG. 2, components of a stow or pick system are depicted according to one embodiment. In the example of FIG. 2, a conveyor system 200 may include a conveyor 210 that transports items 205 that have been removed from packages downstream. The items 205 may be grasped using a robotic manipulator 230 for handling by placing the item 205 into a container such as a tote 250, after which the item 205 may be placed into inventory. The conveyor system 200 may be located in a facility (e.g., warehouse, factory, distribution center, etc.). The system 200 can be located in a fulfillment center that performs various operations in order to ship items 205 to customers. The robotic manipulator 230 may be configured to grasp the item 205. In some embodiments, the items may be singulated or spaced apart, whereas in other embodiments, the items may be cluttered together. As depicted in close up view 240, the manipulator 230 may use an end of arm tool 220 to place the item 205 into the tote 250. The end of arm tool 220 may move about joint 235. In some embodiments, the joint 235 may provide a 360 degree range of motion about the manipulator 230. The manipulator 230 may be combined or integrated with a container opening system as described herein in some embodiments.

FIG. 3 is a schematic illustration of a container opening system 300 in accordance with one or more embodiments of the disclosure. Other embodiments may include additional or fewer components. The illustration of FIG. 3 is not to scale, and may not be illustrated to scale with respect to other figures. The container opening system illustrated in FIG. 3 may be the same system discussed with respect to FIGS. 1A-2.

In FIG. 3, the container opening system 300 may include a robotic manipulator 310, such as a robotic arm, a gantry, or other type of manipulator. The container opening system 300 may be configured to open packages using a container opening device 330, such as a container opening knife, a box cutter, a blade, or another object configured to cut through corrugate and other types of packaging materials. The robotic manipulator 310 and/or an end of arm tool that includes the container opening device 330 may include one or more sensors 320, such as a force sensor, a force feedback sensor, a pressure sensor, a proximity sensor, a speed sensor, and/or another type of sensor. The sensor 320 may be configured to detect or determine at least an axial force applied by or applied on the container opening device 330. In some embodiments, the sensor 320 may be configured to determine lateral force exerted by or on the container opening device 330. The sensor(s) 320 can be disposed in different locations on the robotic manipulator and/or end of arm tool. For example, the sensor(s) can be mounted to one or more of the components of the end of arm tool to allow the end of arm tool to determine the amount of force applied to a package.

The container opening device 330 may be mounted under a flange of the robotic arm, such that the container opening device 330 and/or the end of arm tool to which it is coupled experiences the cutting forces both in longitudinal and normal direction. The flange of the tool may also experience both the cutting forces, as well as the contact force of a roller (or other component adjacent to the sharp edge) against the package. This architecture allows the separation of the cutting forces from the contact forces of the roller.

The container opening system 300 may include one or more cameras 350 and one or more light sources 340. The light source 340 may be configured to illuminate or otherwise direct light on a package. The camera 350 may be configured to image a package. Images captured by the camera 350 may be processed to determine various package features, such as to determine a package identifier, determine package dimensions, determine package geometry, determine package damage, determine seal types for a package (e.g., location of tape, etc.), determine obstacles (e.g., straps, staples, glue, etc. used to seal a package, etc.), and/or additional features. For example, the camera 350 and/or sensor 340 may be in communication with one or more controllers 370 (discussed in more detail with respect to at least FIG. 8).

The container opening system 300 may be configured to determine a cut path 362 for a package 360. The cut path 362 may be custom for the package 360, and may include details such as a cut height at which to cut the package material using the container opening device 330, an axial force and/or lateral force to be applied to the packaging material by the container opening device 330, a speed of movement at which to move the container opening device 330, and/or additional commands or instructions. The controller 370 may be configured to dynamically update the cut path 362 based at least in part on feedback received from the sensor 320 as the packaging material is being cut.

Accordingly, the container opening system 300 may reliably cut open packaging material and open containers without damaging items disposed thereby by cutting deep enough to enable easy removal of the top or upper portion of the package 360 without cutting too deep.

The container opening system 300 may therefore include a robotic manipulator, a container opening knife coupled to the robotic manipulator, a force feedback sensor configured to measure axial force applied to the container opening knife, a camera configured to image a first package, and a light source configured to illuminate the first package. The container opening system 300 may include a controller configured to determine a first image of the first package using the camera, determine, using the first image, a first cut path to open the first package, the first cut path including a first cut height at which to position the container opening knife along an external surface of the first package, and determine, using the first image, a first type of packaging material of the first package. The controller may be configured to determine, using the first type of packaging material and a first machine learning model, a first amount of axial force to apply to the external surface of the first package via the container opening knife, cause the robotic manipulator to position the container opening knife at the first cut height, cause the robotic manipulator to apply the first amount of axial force to the external surface of the first package, and cause the robotic manipulator to move the container opening knife along the first cut path to open the first package.

Using a generated cut strategy for the package, the container opening system 300 may open various types of packages regardless of the sealing used and damage to the package, as well as regardless of the orientation, shape, weight, and/or size of the package.

In one particular example of the container opening system 300 depicted in FIG. 3, the cutting blade may have a compliant pivot point about which a sharp edge can pivot at an angle q. A speed V of the edge can be adjusted with rollers that guide movement of the edge. Depth (lateral across the page in the example of FIG. 3) can be adjusted via input from the robotic manipulator, where a constant depth can be achieved without modification of the angle q. "Snowplowing" and other issues with corrugate can therefore be detected and resolved, and subsequently avoided via training of the machine learning algorithms with observed data.

FIG. 4 depicts an example process flow 400 for automated intelligent opening of containers in accordance with one or more embodiments of the disclosure. While example embodiments of the disclosure may be described in the context of cardboard, it should be appreciated that the disclosure is more broadly applicable to any type of packaging materials. Some or all of the blocks of the process flows in this disclosure may be performed in a distributed manner across any number of devices. The operations of the process flow 600 may be optional and may be performed in a different order.

The process flow 400 may be executed by a controller having one or more computer processors and may be performed in conjunction with a container opening system having a container opening device. In some embodiments, the container opening device is coupled to a robotic manipulator, and the system may include a force sensor configured to measure axial force applied to the container opening device, a camera, and a light source.

At block 410 of the process flow 400, computer-executable instructions stored on a memory of a device, such as a remote server or a container opening system, may be executed to determine a first image of a first package. For example, one or more image processing modules may determine a first image of a first package. Images may be captured using one or more sensors, and may be processed using computer vision. For example, a package to be opened may be conveyed to or otherwise received by a container opening system, and one or more cameras may be used to capture one or more images of the package.

In some embodiments, one or more imaging devices, cameras, imaging sensors, or other types of imaging devices may capture imaging data of a package. The imaging data may include a representation of the item, as well as representations of other items and/or portions of the environment. Further, a control system may receive the imaging data of the item. The imaging data may be processed to determine at least one attribute of the item. For example, the imaging data may be processed using various types of image recognition techniques or algorithms, e.g., edge detection, surface detection, feature detection, object detection, machine learning, and/or various other types of image recognition or computer vision techniques or algorithms. Based on the processing of the imaging data, one or more attributes or characteristics of the package may be determined, such as an packaging material type, package identifier(s), shape, size, dimensions, weight, volume, packaging attributes including seams, corners, edges, hinges, flaps, covers, lids, or others, position and/or orientation relative to one or more other items in proximity, position and/or orientation relative to portions of an environment or package, and/or various other attributes or characteristics of packages.

At block 420 of the process flow 400, computer-executable instructions stored on a memory of a device, such as a remote server or a container opening system, may be executed to determine, using the first image, a first cut path for the container opening device. For example, one or more control modules may determine, using the first image, a first cut path for the container opening device. The cut path may be a path along which a container opening device is to move on the package in order to open the package. The cut path data may include an amount of axial force to be applied to the packaging material, as well as an amount of lateral force and/or speed at which the container opening device is to move along the cut path. The cut path may define a height or vertical position at which the container opening device is to be positioned. In some embodiments, the cut path may be along all sides of a package, whereas in other embodiments, the cut path may be along less than all sides of a package. For example, a tab may remain (or a portion of a sidewall) uncut so that the top of the package remains attached to the bottom or lower portion of the package. Such determinations may be made based at least in part on the contents of the package. Accordingly, in some instances, the cut path does not separate, or does not completely separate, an upper portion of the first package from a lower portion of the first package.

To determine the cut path, the controller may determine, using the first image, a first cut height at which to position the container opening device along an external surface of the first package. The first cut path may be initiated at the first cut height. In some instances, an adjustment to cut height may be needed, such as to avoid staples, damaged package corners, or other obstacles. To adjust cut height in the example of a damaged package, the controller may determine, using the first image, that the first package has a non-rectangular geometry (e.g., a portion of the box was crushed, etc.), and may determine a first adjustment value to a default cut height. The first cut height may then be a sum of the default cut height and the first adjustment value.

Accordingly, in one embodiment, the controller may be configured to determine a second image of a second package using the camera, determine, using the second image, that the second package has a non-rectangular geometry, determine, based at least in part on the determination that the second package has a non-rectangular geometry, a second cut height at which to position the container opening knife along an external surface of the second package, and determine a second cut path to open the second package using the second cut height.

For obstacles or obstructions determined prior to cutting, the controller may generate a cut path that avoids such obstructions. The controller may determine, using the first image and a second machine learning model, that the first package has an obstruction, and may generate an updated cut path (relative to default for the packaging size and material) or modify the first cut path to avoid the obstruction.

Other features, such as package identifiers (e.g., barcodes, printed information, etc.), may be avoided by the cut path as well. For example, the controller may be configured to determine, using the first image and a second machine learning model, that the first package has a printed identifier, and may generate an updated cut path (relative to default for the packaging size and material) or modify the first cut path to avoid the printed identifier.

At block 430 of the process flow 400, computer-executable instructions stored on a memory of a device, such as a remote server or a container opening system, may be executed to determine, using the first image, a first type of packaging material of the first package. For example, one or more image processing modules may determine, using the first image, a first type of packaging material of the first package. The packaging material may be identified via image processing as discussed at least with respect to FIG. 7 and may result in identification of the packaging material thickness and corresponding flute spacing. Such information may be used to determine a cut path for the package, and in particular the axial force amount to be applied by the container opening device.

At block 440 of the process flow 400, computer-executable instructions stored on a memory of a device, such as a remote server or a container opening system, may be executed to determine, using the first type of packaging material and a first machine learning model, a first amount of axial force to apply to the external surface of the first package via the container opening device. For example, one or more machine learning modules may determine, using the first type of packaging material and a first machine learning model, a first amount of axial force to apply to the external surface of the first package via the container opening device. The amount of axial force may be determined so as to puncture the packaging material without damaging the contents of the package. Over time, the machine learning algorithm may improve accuracy based at least in part on feedback data from actual cutting operations as discussed at least with respect to FIG. 5.

At block 450 of the process flow 400, computer-executable instructions stored on a memory of a device, such as a remote server or a container opening system, may be executed to cause the container opening device to (i) apply the first amount of axial force to the external surface of the first package, and (ii) move along the first cut path to open the first package. For example, one or more control modules may cause the container opening device to (i) apply the first amount of axial force to the external surface of the first package, and (ii) move along the first cut path to open the first package. In one example, the controller may cause a robotic manipulator to position the container opening knife at the first cut height, cause the robotic manipulator to apply the first amount of axial force to the external surface of the first package, and cause the robotic manipulator to move the container opening knife along the first cut path to open the first package. As the axial force is applied, the container opening device may puncture the packaging material, and as the lateral force is applied, the container opening device may move along the package following the cut path to separate an upper portion of the package from a lower portion of the package.

At optional block 460 of the process flow 400, computer-executable instructions stored on a memory of a device, such as a remote server or a container opening system, may be executed to monitor force feedback and resistance during container opening device movement. For example, one or more feedback modules may monitor force feedback and resistance during container opening device movement. Axial force feedback can be used for real-time adjustments to the applied axial force, where sudden increases can indicate contact with package contents and trigger a reduction in applied axial force. Lateral force feedback can be used to adjust cut speed and/or lateral movement force of the container opening device in real-time.

For example, the system may adjust cut depth or applied axial force during a cutting operation due to variation in corrugate thickness. The controller may determine, using feedback from one or more sensors while the container opening knife is moving along the first cut path, that a first change to axial force applied to the container opening knife is greater than a threshold (e.g., a sudden jump in axial force). The controller may determine, using the first machine learning model, a second amount of axial force to apply to the external surface of the first package for a remainder of the first cut path (which may be zero), and cause the first machine learning model to be updated based at least in part on the first type of packaging material and the first change to axial force.

Such feedback can be used in conjunction with package data to train or retrain one or more machine learning models, such as the machine learning model used to determine initial axial force and/or the machine learning model used to determine a cut path. Some embodiments may use more than one machine learning model for various individual determinations, whereas other embodiments may use one machine learning model for multiple determinations.

At optional block 470 of the process flow 400, computer-executable instructions stored on a memory of a device, such as a remote server or a container opening system, may be executed to update the first machine learning algorithm using monitored data. For example, one or more machine learning modules may update the first machine learning algorithm using monitored data. Such feedback loops, discussed in more detail with respect to FIG. 5, may improve the ability of the container opening system to open additional types and forms of packages with increased accuracy and reduced risk of damage to package contents.

Figure 5:
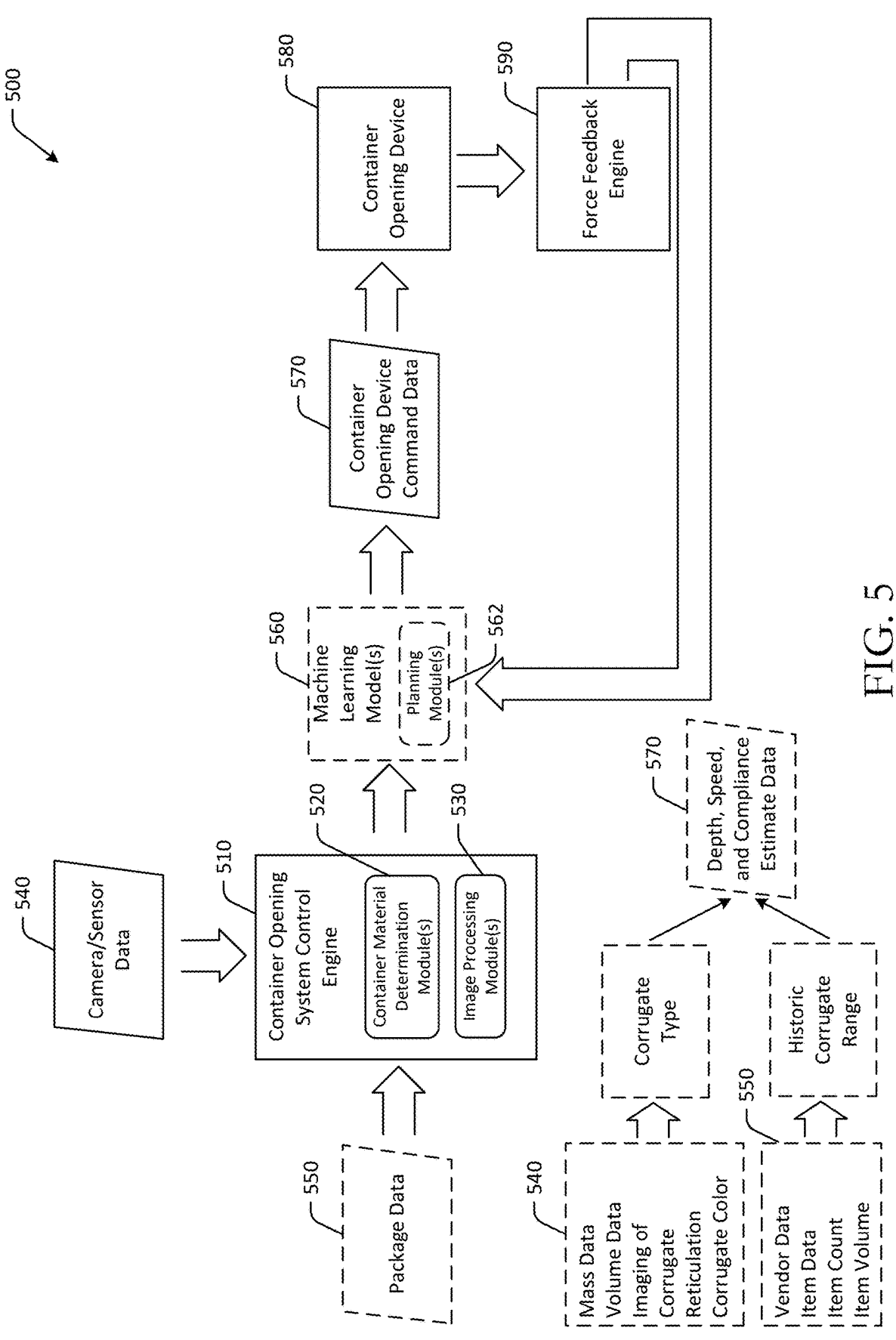
FIG. 5 schematically illustrates an example data flow and machine learning model inputs and outputs for automated intelligent opening of containers in accordance with one or more example embodiments of the disclosure.

FIG. 5 schematically illustrates an example data flow and machine learning model inputs and outputs for automated intelligent opening of containers in accordance with one or more example embodiments of the disclosure. Different embodiments may include different, additional, or fewer inputs or outputs than those illustrated in the examples of FIG. 5.

In FIG. 5, an example data flow 500 is schematically depicted. A container opening system control engine 510 may be configured to determine various package attributes of a package or other container to be opened. In some embodiments, the container opening system control engine 510 may be configured to detect or determine one or more features present in a package, such as packaging material type, presence of obstructions or obstacles, and so forth. The container opening system control engine 510 may be stored at and/or executed by one or more remote servers. The container opening system control engine 510 may include one or more modules or algorithms.

For example, the container opening system control engine 510 may include one or more container material determination module(s) 520 and/or one or more image processing module(s) 530. Additional or fewer, or different, modules may be included. The container material determination module(s) 520 may be configured to process and/or analyze images or other data to determine a packaging material selected from a set of available packaging material options. For example, the container material determination module(s) 520 may be configured to determine a spacing between cardboard flutes and/or corrugate thickness using image processing outputs from the image processing module(s) 530. Container material determination module(s) 520 may include one or more object recognition algorithms configured to detect at least one of flutes, cardboard or corrugate elements, and the like.

The image processing module(s) 530 may be configured to analyze and/or process images captured by the container opening system. For example, the image processing module(s) 530 may be configured to process images using 2D Fourier transforms and other image processing algorithms to extract data related to packaging material type and/or configuration.

The container opening system control engine 510 may receive one or more inputs for a package that is to be opened. For example, the container opening system control engine 510 may receive one or more of camera/sensor data 540 associated with images or other data captured for a package to be opened, as well as optional package data 550 associated with the package that is to be opened. In some embodiments, the camera/sensor data 540 may be determined using cameras or sensors, while the optional package data 550 may be determined using a database. For example, the package data 550 may be determined using a package identifier or barcode on the package, where the package data indicates the contents of the package. Such information can be used to determine a cut path, or in particular a cut force. For example, a package with clothing inside may have a lower cut force than a package with plastic containers inside.

The container opening system control engine 510 may process the respective data associated with the package that is to be opened. For example, the camera/sensor data 540 may be processed using one or more of the container material determination module(s) 520 and/or the image processing module(s) 530. Likewise, the package data 550 may be processed using one or more of the modules or algorithms of the container opening system control engine 510.

Using one or more algorithms or modules, the container opening system control engine 510 may determine a packaging material type of the package that has a highest probability value. For example, the packaging material type may be selected from a set of packaging material types, where the highest probability value or highest ranked type is selected. Other features, such as flute spacing may be determined using the container opening system control engine 510.

The container opening system control engine 510 may output detected feature data to one or more machine learning model(s) 560, such as a cut path machine learning model(s) (e.g., the cut path machine learning model(s), a force adjustment machine learning model(s), and so forth may be the same in some embodiments, etc.). The machine learning model(s) 560 may be configured to generate or output container opening device command data 570, which may include instructions to execute a cut path for the package. The machine learning model(s) 560 may be configured to generate the cut path for the package. For example, the machine learning model(s) 560 may include one or more modules, such as an optional planning module(s) 562, which may be configured to generate a cut path for a particular package. The machine learning model(s) 560 may be configured to receive the output from the container opening system control engine 510 as one or more inputs, and may generate container opening device command data 570. The container opening device command data 570 may be sent to, or otherwise used by, a container opening device 580 to open the package. As the container opening device command data 570 is implemented by the container opening device 580, a force feedback engine 590 may generate real-time force feedback for axial and/or lateral forces exerted on the container opening device 580. Such force feedback data may be sent to the machine learning model(s) 560 to update and/or retrain the machine learning model(s) 560. As a result, the machine learning model(s) 560 may be continuously updated and accuracy improved.

In one example, the machine learning model(s) 560 may be configured to account for variation in the amount of tape used for closure of a package. For example, the machine learning model(s) 560 may adapt the cut depth and rate to account for extra resistance. In another example, the machine learning model(s) 560 may account for variation in the overall size as well as the aspect ratios of length, width and height. The machine learning model(s) 560 may integrate point cloud mapping to plan the height of the cut path. In another example, to account for variation in non-rectangular shape due to how the package was packed or what deformation the case experienced during shipment, the machine learning model(s) 560 may integrate point cloud mapping solutions to plan the cut path along the surface of the case at an optimal height. In another example, to account for variation in corrugate thickness across a portion of the same package, the machine learning model(s) 560 may assign an initial cut depth that is then adjusted during the actual cutting operation. The results can be fed back into the machine learning model(s) 560. To account for deformation of the package during cutting.

As a result, the system may be configured to determine, using a force sensor while the container opening device is moving along the first cut path, that a first change to axial force applied to the container opening device is greater than a threshold. For example, the threshold may be an increase or a decrease of 15% of the first axial force (e.g., a sudden spike or decrease in force greater than 15% a planned applied force, etc.). Thresholds other than 15% may be used. The system may determine a second amount of axial force to apply to the external surface of the first package for a remainder of the first cut path, such as a reduction of the planned axial force by 15%, and may cause the machine learning model(s) 560 to be updated based at least in part on the first type of packaging material and the first change to axial force.

In another example, the system may be configured to determine that an amount of resistance as the container opening device moves along the first cut path is greater than a threshold. For example, the threshold may be an increase or a decrease of 25% of a planned lateral force (e.g., a sudden spike or decrease in force greater than 25% a planned lateral force, etc.). Thresholds other than 25% may be used. The system may determine, using a second machine learning model, an adjustment to a lateral movement speed for the container opening device, such as an increase or decrease in speed of 25%, and may cause the container opening device to move at the adjusted lateral movement speed.

In another example, the system may determine, after applying the first amount of axial force to the external surface of the first package, that a reduction in axial force applied to the container opening device is less than a threshold. For example, if the reduction is less than a threshold, the container opening device may not have pierced the cardboard. The system may therefore determine, using the first machine learning model, a second amount of axial force to apply to the external surface of the first package via the container opening device. The second amount of axial force may be greater than the first amount of axial force, so as to increase a likelihood that the cardboard is pierced.

In another example, the system may be configured to determine, after applying the first amount of axial force to the external surface of the first package, that an increase in axial force applied to the container opening device is greater than a threshold, which may indicate that the container opening device is in contact with the items or contents of the package. The system may therefore determine, using the first machine learning model, a second amount of axial force to apply to the external surface of the first package via the container opening device. The second amount of axial force may be less than the first amount of axial force, so as to decrease a likelihood that the package contents are damaged during opening of the package.

In one particular example, the camera/sensor data 540 can include case mass data, case volume data, imaging data of corrugate reticulation, corrugate color data, and so forth. Such data 540 can be used to determine a corrugate type. Similarly, the package data 550 can include vendor data, item data, item count, item volume, and so forth. Such data 550 can be used to determine a historic corrugate range. The combined corrugate type and historic corrugate range can be used to generate depth, speed, and compliance estimate data, which may be the container opening device command data 570.

The container opening device command data 570 can be further adjusted by imaging the amount of tape, case deformation and staple location. The container opening device command data 570 can include the cut path, the cutting angle of the blade, depth of the blade, speed of the blade, compliance settings for both the blade and the robotic arm path planning, and/or staple skip zones. Assessment of the case damage, deformation and previous history with the supplier can be used to determine whether a cut is attempted or the case is passed through for manual opening.

Figure 7:
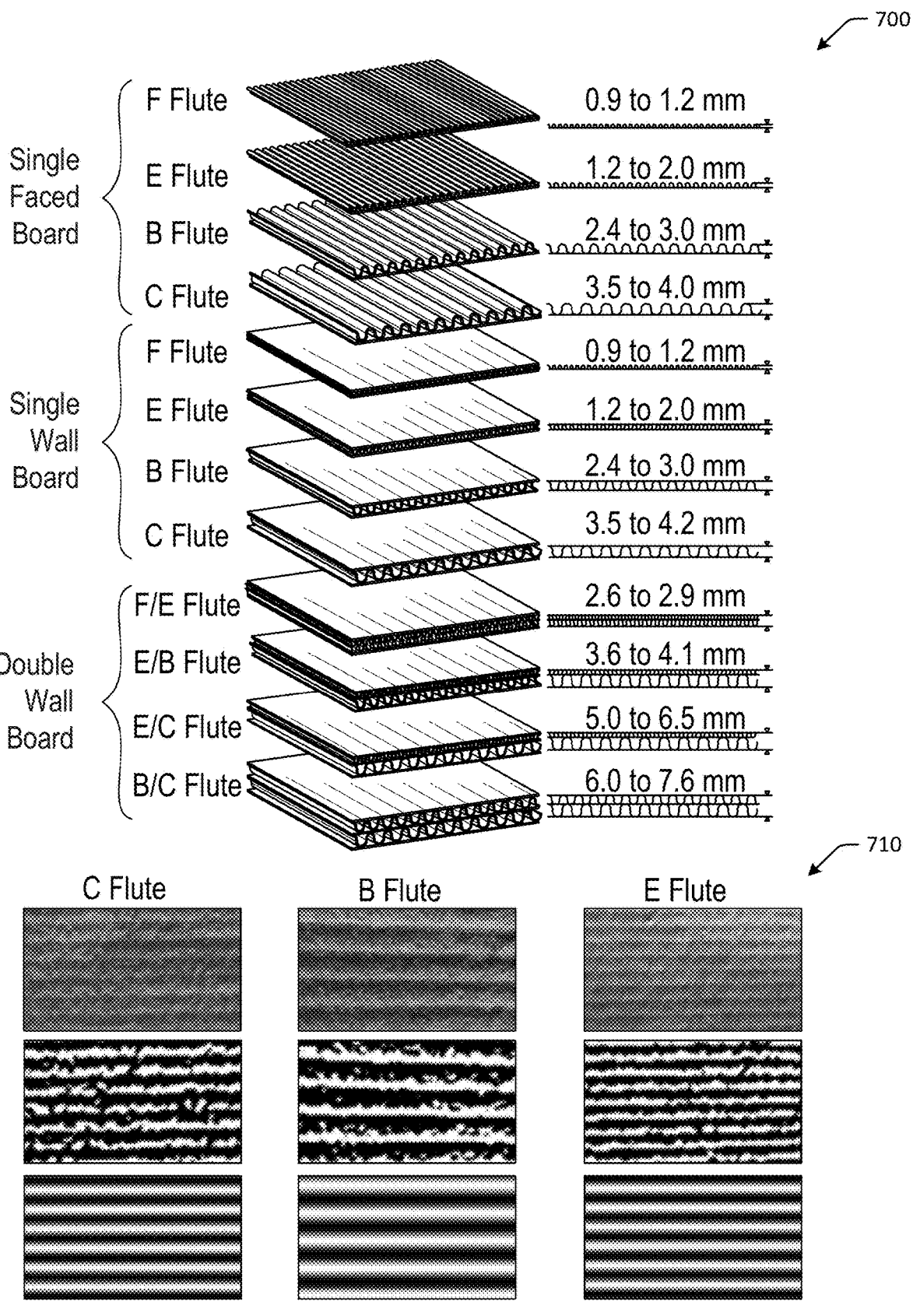
FIG. 7 is a schematic illustration of various corrugate packaging materials having different flute thicknesses and corrugate flute detection images in accordance with one or more embodiments of the disclosure.

FIG. 6 depicts example force measurements in accordance with one or more embodiments of the disclosure. Other embodiments may include additional or fewer components. The illustrations of FIG. 7 are not to scale, and may not be illustrated to scale with respect to other figures.

In FIG. 6, a first graph 600 depicts force in Newtons over a distance in millimeters, where the force represents the cut force perpendicular to the surface of the cardboard or other packaging material in the X-direction. In a first region 602, force is close to zero before the container opening device contacts the packaging material. A second region 604 covers the measured force between first contact of the tip blade until the tip exits the cardboard (e.g., goes through the cardboard). Forces increase over the stroke, accounting for the cutting force and friction of the blade. As the blade dives deeper into the cardboard, the surface area of the blade in contact with the cardboard increases. Thus, the increase of the measured force. A third region 606 covers the measured force between the tip of the blade exiting the cardboard until end of the stroke. The component of the force in X direction decreases, meaning that items inside the package have not been contacted, but the blade has passed through the cardboard. The lateral cutting motion can be initiated. Note that in the example of FIG. 6, the cardboard corrugate thickness (C flute) is 4 mm. However, the first region 602 and the second region 604 span over 9.5 mm. This can be explained by the compliance of the cardboard material. The monitoring of force compliance can be an additional input into the image base machine learning models to provide an integrated, real time input to the models that allows them to continue learning with data collected automatically.

A second graph 610 depicts force in the Y-direction in Newtons over distance in millimeters. The Y-direction may be a cutting or lateral direction. As force is applied laterally by the container opening device, the speed and/or force applied can be modified to keep the force within certain bounds, so as to avoid tearing or ripping the packaging material and/or causing wrinkles or other complications. In this manner, dynamic feedback can be used to increase or decrease speed and/or force of the container opening device in the cutting direction.

In addition, force feedback can be used to avoid undetected obstacles, such as staples. A sudden increase in the force depicted in the second graph 610 may indicate that the container opening device has encountered an obstacle, and cutting action may be paused. The measured force in longitudinal direction can be used to detect a collision. As a peak in force is detected, the blade can be retracted to avoid damage.

For packages with thin or flimsy packaging material, deformation of the package during cutting can be mitigated by having the container opening device follow the contour of the package and applying a constant normal force. To minimize the frictional forces as it slides along the cardboard case, a roller can be used to guide movement.

FIG. 7 is a schematic illustration of various corrugate packaging materials having different flute thicknesses and corrugate flute detection images in accordance with one or more embodiments of the disclosure. Other embodiments may include additional or fewer components. The illustrations of FIG. 7 are not to scale, and may not be illustrated to scale with respect to other figures.

A first illustration 700 depicts various corrugate packaging materials and flute thicknesses. Corrugate flute is the wavy material sandwiched in between two walls of paperboard. Fluting reinforces or stiffens the corrugated material so that it is less likely to be crushed or collapse. A single faced board may have C Flute-F Flute thicknesses ranging from 3.5 millimeters to 4.0 millimeters (C Flute) to 0.9 millimeters to 1.2 millimeters (F Flute). Such information may be used as inputs to one or more machine learning algorithms as baseline values when determining cut paths. A single wall board may have C Flute-F Flute thicknesses ranging from 3.5 millimeters to 4.2 millimeters (C Flute) to 0.9 millimeters to 1.2 millimeters (F Flute). Such information may be used as inputs to one or more machine learning algorithms as baseline values when determining cut paths. A double wall board may have C Flute-F Flute thicknesses ranging from 6.0 millimeters to 7.6 millimeters (C Flute) to 2.6 millimeters to 2.9 millimeters (F Flute). Such information may be used as inputs to one or more machine learning algorithms as baseline values when determining cut paths.

Sample corrugate flute images 710 may be determined by a container opening system, such as those described with respect to FIGS. 1-6. A camera may be used in conjunction with a light source to capture images of the package. The image may be processed to determine spacing of the flutes, which is directly related to the thickness of the corrugate. Image processing can use 2D Fourier transforms, for instance, to improve the robustness of measured spacing. The examples of FIG. 7 illustrate one way of resolving using both baseline frequency and phase information. During a cutting operation, as the blade cuts perpendicular to the flutes in the corrugate the force varies in rhythm with the flutes. The rhythm frequency is directly relate to the flute spacing. For C flute, the average distance between peaks of the force measurement is 8.3 mm. This corresponds to the standard spacing in C flute (7.2 mm-8.5 mm).

One or more operations of the methods, process flows, or use cases of FIGS. 1A-7 may have been described above as being performed by a container opening system, or more specifically, by one or more program module(s), applications, or the like executing on a device. It should be appreciated, however, that any of the operations of the methods, process flows, or use cases of FIGS. 1A-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1A-7 may be described in the context of the illustrative devices, it should be appreciated that such operations may be implemented in connection with numerous other device configurations.

The operations described and depicted in the illustrative methods, process flows, and use cases of FIGS. 1A-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1A-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
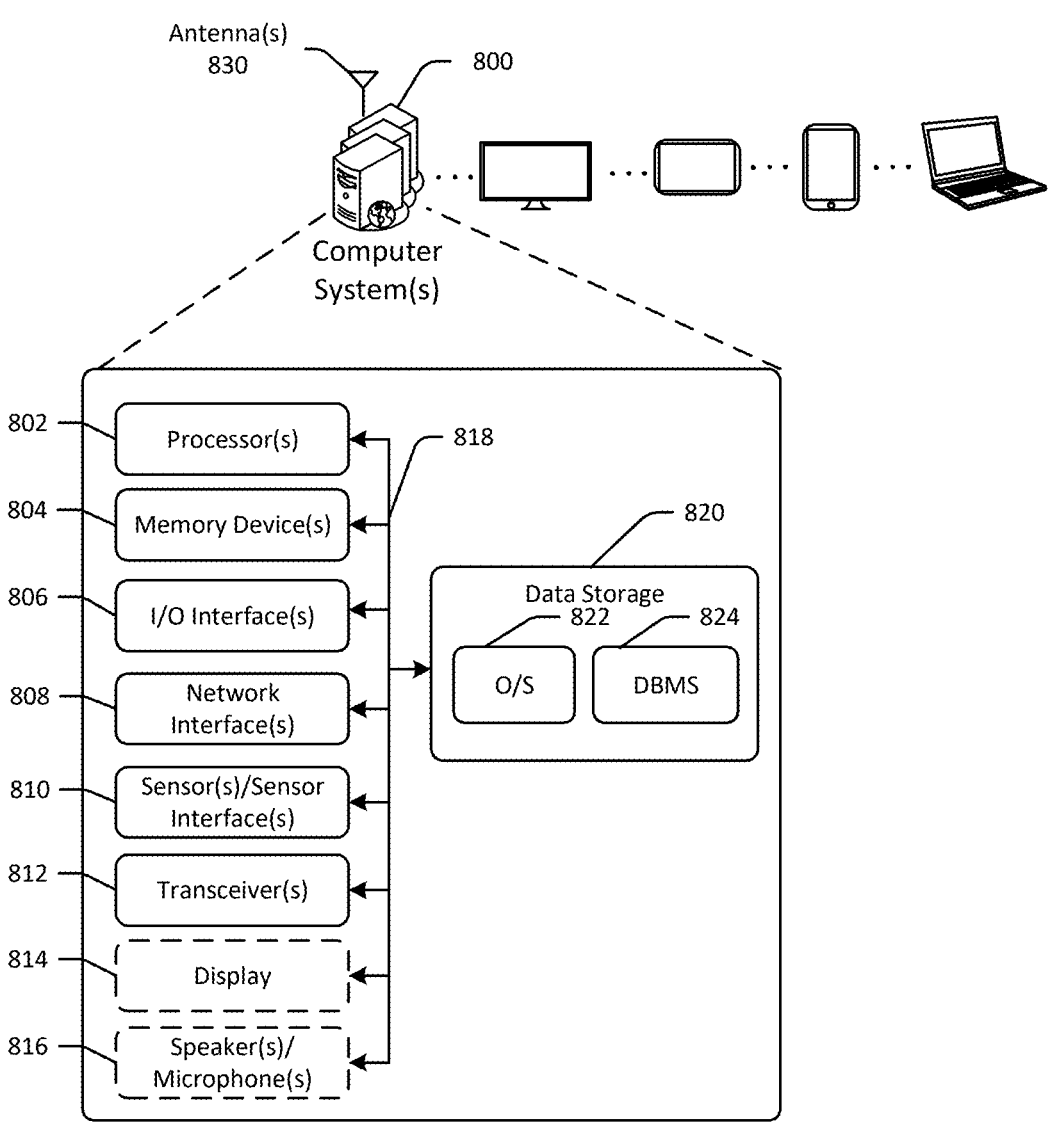
FIG. 8 schematically illustrates an example architecture of a computer system associated with a container opening system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1A-7. For example, the computer system(s) 800 may control one or more aspects of the container opening systems, robotic manipulators, and/or end of arm tools described in FIGS. 1A-7, such as determining whether items are grasped, determining end of arm tool positioning, determining when and what distance to extend engagement members, determine when and how long to actuate suction cups, determining force feedback, determining initial force values, and so forth.

The computer system(s) 800 may be configured to communicate with one or more servers, user devices, cameras, or the like. The computer system(s) 800 may be configured to identify items, control container opening systems, retrieve items or containers, move items or containers, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), Fire Wire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.1 lad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container opening system comprising:
a robotic manipulator;
a container opening knife coupled to the robotic manipulator;
a force feedback sensor configured to measure axial force applied to the container opening knife;
a camera configured to image a first package;
a light source configured to illuminate the first package; and
a controller configured to:
determine a first image of the first package using the camera;
determine, using the first image, a first cut path to open the first package, the first cut path comprising a first cut height at which to position the container opening knife along an external surface of the first package;
determine, using the first image and a second machine learning model, that the first package has an obstruction, wherein the first cut path dynamically avoids the obstruction;
determine, using the first image, a first type of packaging material of the first package;
determine, using the first type of packaging material and a first machine learning model, a first amount of axial force to apply to the external surface of the first package via the container opening knife;
cause the robotic manipulator to position the container opening knife at the first cut height;
cause the robotic manipulator to apply the first amount of axial force to the external surface of the first package;
cause the robotic manipulator to move the container opening knife along the first cut path to open the first package;
determine, using the force feedback sensor while the container opening knife is moving along the first cut path, that a first change to axial force applied to the container opening knife is greater than a predetermined threshold;
determine, using the first machine learning model, a second amount of axial force to apply to the external surface of the first package for a remainder of the first cut path based at least in part on the first change being greater than the predetermined threshold; and cause the first machine learning model to be updated based at least in part on the first type of packaging material and the first change to axial force.

2. The container opening system of claim 1, wherein the controller is further configured to:
determine a second image of a second package using the camera;
determine, using the second image, that the second package has a non-rectangular geometry;
determine, based at least in part on the determination that the second package has a non-rectangular geometry, a second cut height at which to position the container opening knife along an external surface of the second package; and
determine a second cut path to open the second package using the second cut height.

3. The container opening system of claim 1, wherein the first cut path does not completely separate an upper portion of the first package from a lower portion of the first package.

4. A system comprising:
a container opening device; and
a controller configured to:
determine a first image of a first package;
determine, using the first image, a first cut path for the container opening device;
determine, using the first image and a second machine learning model, that the first package has an obstruction, wherein the first cut path dynamically avoids the obstruction;
determine, using the first image, a first type of packaging material of the first package;
determine, using the first type of packaging material and a first machine learning model, a first amount of axial force to apply to the external surface of the first package via the container opening device;
cause the container opening device to (i) apply the first amount of axial force to the external surface of the first package, and (ii) move along the first cut path to open the first package;
determine that an amount of resistance as the container opening device moves along the first cut path is greater than a first predetermined threshold;
determine, using a second machine learning model, an adjustment to a lateral movement speed for the container opening device based at least in part on the amount of resistance being greater than the first predetermined threshold; and
cause the container opening device to move at the adjusted lateral movement speed.

5. The system of claim 4, wherein the controller is further configured to:
determine, using the first image, a first cut height at which to position the container opening device along an external surface of the first package;
wherein the first cut path is at the first cut height.

6. The system of claim 5, wherein the controller is further configured to:
determine, using the first image, that the first package has a non-rectangular geometry; and
determine a first adjustment value to a default cut height;
wherein the first cut height is a sum of the default cut height and the first adjustment value.

7. The system of claim 4, wherein the controller is further configured to:
determine, using a force sensor while the container opening device is moving along the first cut path, that a first change to axial force applied to the container opening device is greater than a second predetermined threshold;

determine a second amount of axial force to apply to the external surface of the first package for a remainder of the first cut path; and cause the first machine learning model to be updated based at least in part on the first type of packaging material and the first change to axial force.

8. The system of claim 4, wherein the controller is further configured to:

determine, after applying the first amount of axial force to the external surface of the first package, that a reduction in axial force applied to the container opening device is less than a second predetermined threshold; and determine, using the first machine learning model, a second amount of axial force to apply to the external surface of the first package via the container opening device.

9. The system of claim 4, wherein the controller is further configured to:

determine, after applying the first amount of axial force to the external surface of the first package, that an increase in axial force applied to the container opening device is greater than a second predetermined threshold; and determine, using the first machine learning model, a second amount of axial force to apply to the external surface of the first package via the container opening device.

10. The system of claim 4, wherein the controller is further configured to:

determine, using the first image and a second machine learning model, that the first package has a printed identifier;

wherein the first cut path avoids the printed identifier.

11. The system of claim 4, wherein the first cut path does not separate an upper portion of the first package from a lower portion of the first package.

12. The system of claim 4, wherein the container opening device is coupled to a robotic manipulator, and wherein the system further comprises:

a force sensor configured to measure axial force applied to the container opening device;

a camera; and a light source.

13. A container opening system comprising:

a container opening device; and a controller configured to:

determine a first image of a first package;

determine, using the first image, a first cut path for the container opening device;

determine, using the first image and a second machine learning model, that the first package has an obstruction, wherein the first cut path dynamically avoids the obstruction;

determine, using the first image, a first cut height at which to position the container opening device along an external surface of the first package, wherein the first cut path is at the first cut height;

determine, using the first image, a first type of packaging material of the first package;

determine, using the first type of packaging material and a first machine learning model, a first amount of axial force to apply to the external surface of the first package via the container opening device;

cause the container opening device to apply the first amount of axial force to the external surface of the first package;

cause the container opening device to move along the first cut path to open the first package;

determine, while the container opening knife is moving along the first cut path, that a first change to axial force applied to the container opening knife is greater than a first predetermined threshold;

determine, using the first machine learning model, a second amount of axial force to apply to the external surface of the first package for a remainder of the first cut path based at least in part on the first change being greater than the first predetermined threshold; and cause the first machine learning model to be updated based at least in part on the first type of packaging material and the first change to axial force.

14. The container opening system of claim 13, wherein the controller is further configured to:

determine that an amount of resistance as the container opening device moves along the first cut path is greater than a second predetermined threshold;

determine, using a second machine learning model, an adjustment to a lateral movement speed for the container opening device; and cause the container opening device to move at the adjusted lateral movement speed.

15. The container opening system of claim 13, wherein the controller is further configured to:

determine, after applying the first amount of axial force to the external surface of the first package, that a reduction in axial force applied to the container opening device is less than a second predetermined threshold; and determine, using the first machine learning model, a second amount of axial force to apply to the external surface of the first package via the container opening device.

16. The container opening system of claim 13, wherein the first cut path does not separate an upper portion of the first package from a lower portion of the first package.

17. The container opening system of claim 13, wherein the container opening device is coupled to a robotic manipulator, and wherein the system further comprises:

a force sensor configured to measure axial force applied to the container opening device;

a camera; and a light source.

* * * * *